(12) United States Patent
Bowden et al.

(10) Patent No.: US 10,890,091 B2
(45) Date of Patent: Jan. 12, 2021

(54) DOSING MODULE HAVING REMOVABLE DOSING TRAY

(71) Applicant: CUMMINS EMISSION SOLUTIONS INC., Columbus, IN (US)

(72) Inventors: Tony Bowden, Seymour, IN (US); Nicholas Blodgett, Columbus, IN (US); Taren Dehart, Columbus, IN (US); Tyler Lorenz, McFarland, WI (US)

(73) Assignee: Cummins Emission Solutions Inc., Columbus, IN (US)

(*) Notice: Subject to any disclaimer, the term of this patent is extended or adjusted under 35 U.S.C. 154(b) by 153 days.

(21) Appl. No.: 15/794,837

(22) Filed: Oct. 26, 2017

(65) Prior Publication Data

US 2019/0128164 A1    May 2, 2019

(51) Int. Cl.
*F01N 3/20* (2006.01)
*F01N 13/18* (2010.01)

(52) U.S. Cl.
CPC ............ *F01N 3/208* (2013.01); *F01N 3/206* (2013.01); *F01N 3/2066* (2013.01); *F01N 13/18* (2013.01); *F01N 2390/02* (2013.01); *F01N 2610/02* (2013.01); *F01N 2610/085* (2013.01); *F01N 2610/14* (2013.01); *F01N 2610/144* (2013.01); *F01N 2610/1406* (2013.01);
(Continued)

(58) Field of Classification Search
CPC ............... F01N 3/208; F01N 2610/146; F01N 2610/1453; F01N 2610/144; F01N 2610/1433; F01N 2610/1406; F01N 2610/02; F01N 2390/02; F01N 3/206; F01N 3/2066; F01N 13/18; F01N 2610/085; F01N 2610/14; Y02T 10/12
See application file for complete search history.

(56) References Cited

U.S. PATENT DOCUMENTS 4,145,813 A * 3/1979 Hall .................. A61C 1/0038
                                                  137/625.18
4,345,572 A * 8/1982 Suzuki .................. F02M 26/35
                                                  123/568.11
(Continued)

OTHER PUBLICATIONS

International Search Report and Written Opinion issued for PCT/US2018/057738, dated Jan. 15, 2019, 7 pages.

*Primary Examiner* — Kevin F Murphy
*Assistant Examiner* — Patrick C Williams
(74) *Attorney, Agent, or Firm* — Foley & Lardner LLP

(57) ABSTRACT

A dosing module includes a frame assembly, a first manifold, a first dosing tray, and a first rail assembly. The frame assembly includes a plurality of panels. The first manifold is coupled to one of the plurality of panels. The first manifold is configured to separately receive air and reductant. The first manifold includes a first connector extending from the first manifold. The first dosing tray includes a first base panel, a second manifold, and a second connector. The second manifold is coupled to the first base panel. The second manifold is configured to separately receive air and reductant from the first manifold and to provide the air and the reductant back to the first manifold. The second connector extends from the second manifold. The second connector is configured to be selectively coupled to the first connector. The first rail assembly includes a first member and a second member.

19 Claims, 11 Drawing Sheets

(52) U.S. Cl.
CPC .................. *F01N 2610/146* (2013.01); *F01N 2610/1433* (2013.01); *F01N 2610/1453* (2013.01); *Y02T 10/12* (2013.01)

(56) References Cited

U.S. PATENT DOCUMENTS

| | | | |
|---|---|---|---|
| 6,523,563 B2* | 2/2003 | Cho | C23C 16/455 |
| | | | 118/728 |
| 7,157,060 B1 | 1/2007 | Newburry | |
| 8,950,179 B2 | 2/2015 | Rao et al. | |
| 2005/0087239 A1* | 4/2005 | Kohda | F16L 37/23 |
| | | | 137/614.03 |
| 2011/0265459 A1* | 11/2011 | Mupparapu | F01N 3/2066 |
| | | | 60/286 |
| 2013/0199160 A1 | 8/2013 | Kruer et al. | |
| 2013/0343959 A1* | 12/2013 | Golin | B01D 53/9477 |
| | | | 422/170 |
| 2014/0127107 A1 | 5/2014 | Suchak | |
| 2016/0069235 A1 | 3/2016 | Kregling et al. | |
| 2016/0151133 A1* | 6/2016 | Luettgen | F04B 53/14 |
| | | | 433/80 |
| 2016/0348558 A1 | 12/2016 | Garduno et al. | |
| 2017/0044955 A1 | 2/2017 | Wehler et al. | |

* cited by examiner

DOSING MODULE HAVING REMOVABLE DOSING TRAY

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a liquid reductant. The catalyst may be included in a catalyst chamber of an exhaust system, such as that of a vehicle or power generation unit. A liquid reductant, such as anhydrous ammonia, aqueous ammonia, diesel exhaust fluid (DEF), or aqueous urea, is typically introduced into the exhaust gas flow prior to the catalyst chamber.

To introduce the liquid reductant into the exhaust gas flow for the SCR process, an SCR system may dose or otherwise introduce the liquid reductant through a dosing module that vaporizes or sprays the liquid reductant into an exhaust pipe of the exhaust system up-stream of the catalyst chamber. In some applications, such as high horsepower applications, the reductant may form deposits that may collect within the exhaust pipe. These deposits accumulate over time and may correspondingly decrease the efficiency (e.g., conversion efficiency, etc.) and, therefore, the desirability of the SCR process.

SUMMARY

In an embodiment, a dosing module includes a frame assembly, a first manifold, a first dosing tray, and a first rail assembly. The frame assembly includes a plurality of panels. The first manifold is coupled to one of the plurality of panels. The first manifold is configured to separately receive air and reductant. The first manifold includes a first connector extending from the first manifold. The first dosing tray includes a first base panel, a second manifold, and a second connector. The second manifold is coupled to the first base panel. The second manifold is configured to separately receive air and reductant from the first manifold and to provide the air and the reductant back to the first manifold. The second connector extends from the second manifold. The second connector is configured to be selectively coupled to the first connector. The first rail assembly includes a first member and a second member. The first member is coupled to one of the plurality of panels. The second member is coupled to the first base panel and slidably coupled to the first member such that the first dosing tray is selectively movable relative to the first member.

In another embodiment, a dosing module includes a frame assembly, a first manifold, and a first dosing tray. The frame assembly includes a first panel. The first manifold is coupled to the first panel. The first manifold is configured to separately receive air and reductant. The first dosing tray is positioned within the frame assembly. The first dosing tray includes a second manifold configured to be selectively coupled to the first manifold. The second manifold, when coupled to the first manifold, is configured to: (i) separately receive air and reductant from the first manifold, (ii) meter the air and the reductant, and (iii) provide the air and the reductant back to the first manifold.

In still another embodiment, a dosing tray for a dosing module is configured to be selectively coupled to an external connector external to the dosing tray, the dosing tray including a base panel, a manifold, a valve, and a module. The manifold is coupled to the base panel. The manifold is configured to separately receive air and reductant and provide the air and the reductant. The manifold includes a second connector configured to be selectively coupled to the external connector such that: (i) at least one of the air and the reductant is flowable between the second connector and the external connector when the second connector is coupled to the external connector and (ii) the second connector is sealed when the second connector is not coupled to the external connector thereby preventing the flow of at least one of the air and the reductant between the second connector and the external connector. The valve is coupled to the manifold. The valve is configured to alter an amount of the reductant provided by the manifold. The module is electrically communicable with the valve and configured to control the valve. The second connector is configured to be coupled to and decoupled from the external connector through translation of the base panel relative to the dosing module.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
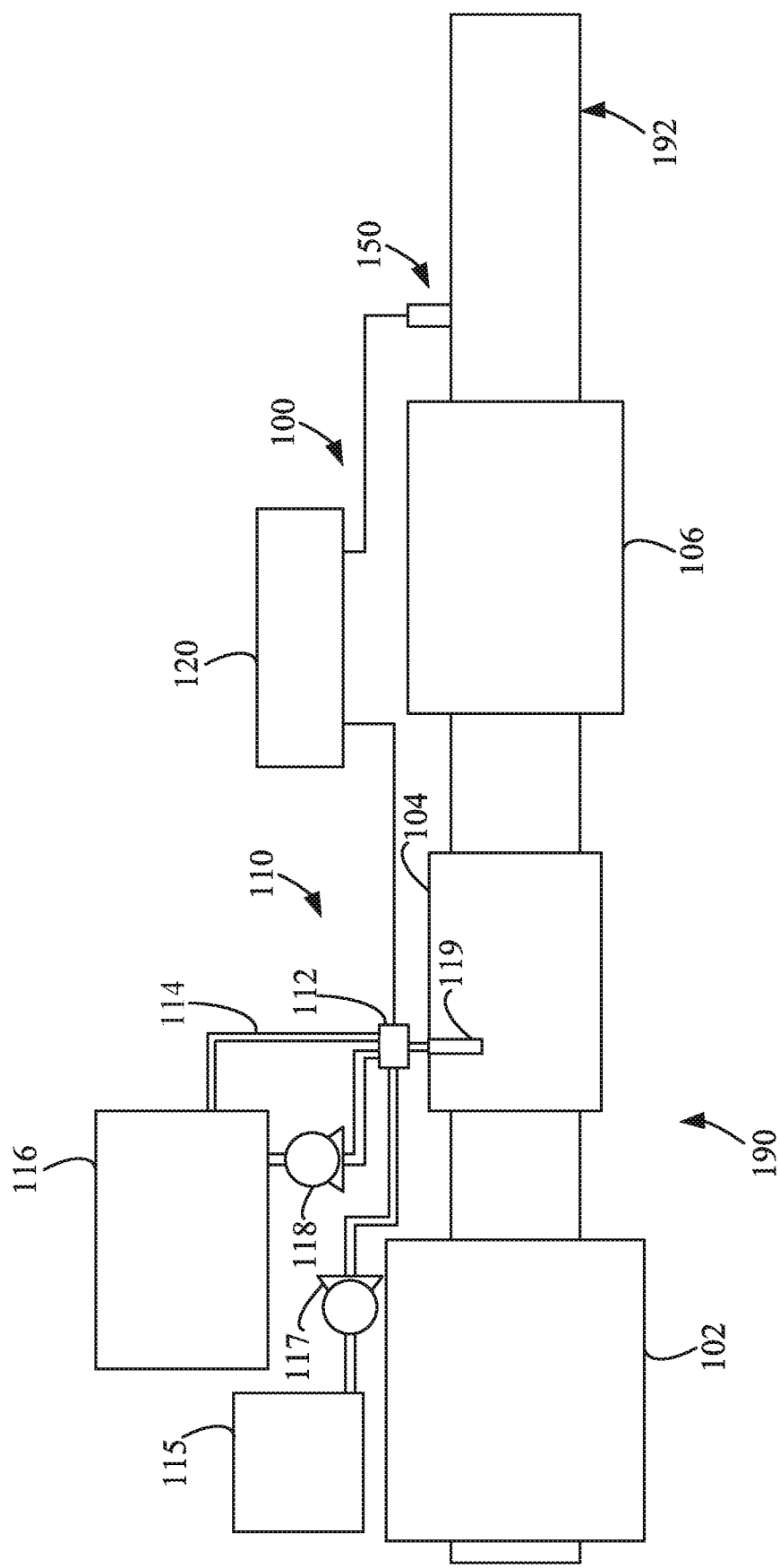
FIG. 1 is a block schematic diagram of an example aftertreatment system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for a dosing module having a removable dosing tray. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated within an aftertreatment system. This treatment often includes treating (e.g., dosing, etc.) the exhaust gasses with a reductant. Dosing of the exhaust gasses is typically performed by providing the exhaust gasses with pressurized reductant. However, this reductant may cause deposits to form within the aftertreatment system in some applications. In order to increase the efficiency of the aftertreatment system in these applications, it is desirable to minimize the formation of these deposits.

Implementations described herein relate to a dosing module that receives and provides air and reductant to various static dosing lances within a static dosing lance assembly. The dosing module described herein includes at least one removable dosing tray. Each of the dosing trays provides individual control for a static dosing lance. This individual control is facilitated by, among other components, a manifold, valves, and a module that cooperatively function to meter air and reductant to provide the air and the reductant from the manifold such that a target air-reductant mixture may be produced by a dosing lance or dosing lance assembly.

The manifold on the dosing tray includes a connector that is selectively coupled to, and decoupled from, a connector on a manifold mounted to a frame assembly in response to translation (e.g., horizontal translation, etc.) of the dosing tray relative to the frame assembly. Each of the connectors is configured such that the connector is sealed when the connector is not coupled to another connector and such that the connector is not sealed when the connector is coupled to another connector. In this way, leakage out of the connectors is minimized when a sealed flow path between connectors is not present. The horizontal translation of the dosing tray is facilitated by at least one rail assembly that includes two members: one member coupled to the dosing tray and one member coupled to the frame assembly. The dosing tray is removable from the at least one rail assembly so that the dosing tray can be removed from the dosing module and serviced and/or replaced with another dosing module. In this way, the dosing tray facilitates rapid repair or replacement. The dosing tray described herein is relatively easy to remove due to the connectors on the manifold and the use of the rail assembly. In comparison, conventional dosing systems may require arduous and technically challenging repair or replacement of an entire system.

When the dosing module described herein includes two dosing trays, the dosing module can continue to operate when one of the dosing trays is removed or otherwise decoupled from the manifold mounted to the frame assembly. In this way, the dosing module described herein provides flexibility to the operation of an aftertreatment system, which is not currently available using conventional dosing systems. In contrast, conventional dosing systems may be required to be non-operational during repair, leading to downtime of an associated aftertreatment system.

II. Overview of Aftertreatment System

FIG. 1 depicts an aftertreatment system 100 having an example reductant delivery system 110 for an exhaust system 190. The exhaust system 190 receives exhaust gasses from an internal combustion engine (e.g., thirty-eight liter displacement internal combustion engine, one-hundred and twenty liter displacement internal combustion engine, etc.). The aftertreatment system 100 includes a particulate filter (e.g., a diesel particulate filter (DPF) 102), the reductant delivery system 110, a decomposition chamber 104 (e.g., reactor, etc.), a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or DEF, into ammonia. The decomposition chamber 104 includes a reductant delivery system 110 having a dosing module 112 (e.g., doser, etc.) configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The dosing module 112 is physically separated from the decomposition chamber 104. The dosing module 112 is fluidly coupled to one or more reductant sources 116. In some implementations, a pump 118 may be used to pressurize the reductant from the reductant sources 116 for delivery to the dosing module 112. The dosing module 112 receives the reductant from the reductant sources 116 via the pump 118, and may provide the reductant back to the reductant sources 116 via a return passage 114.

The dosing module 112 is also fluidly coupled to one or more air sources 115. For example, the air sources 115 may be an air intake or air storage device (e.g., tank, etc.). A pump 117 (e.g., lift pump, etc.) is used to pressurize the air from the air sources 115 for delivery to the dosing module 112 (e.g., via pressurized conduits, etc.).

The dosing module 112 may receive the air from the air sources 115 and separately receive the reductant from the reductant sources 116. The dosing module 112 may provide the air into the decomposition chamber 104 via a static dosing lance assembly 119 and may separately provide the reductant into the decomposition chamber 104 via the static dosing lance assembly 119. The static dosing lance assembly 119 may be configured to disperse the air and the reductant into the decomposition chamber 104 such that a target air-reductant mixture is obtained within the decomposition chamber 104. The static dosing lance assembly 119 may also be configured to disperse the air and the reductant with a target trajectory or dispersion pattern. The static dosing lance assembly 119 may contain a single dosing lance or a plurality of dosing lances such that the dosing module 112 can be tailored for a target application.

The dosing module 112 may mix the air from the air sources 115 and the reductant from the reductant sources 116 and provides the air-reductant mixture into the decomposition chamber 104 via a static dosing lance assembly 119. The static dosing lance assembly 119 may be configured to disperse the air-reductant mixture into the decomposition chamber 104 with a target trajectory or dispersion pattern.

The dosing module 112, the pump 117, and the pump 118 are also electrically or communicatively coupled to a controller 120. The controller 120 is configured to control the dosing module 112 to meter the air and the reductant provided into the decomposition chamber 104. In some applications, the controller 120 may control the dosing module 112 to meter the air and the reductant such that a target air-reductant mixture is obtained within the decomposition chamber 104. The controller 120 may also be configured to control the pump 117 and/or the pump 118. For example, the controller 120 may control the pump 117 and the pump 118 to obtain a target air-reductant mixture within the decomposition chamber 104 (e.g., as dispensed via the static dosing lance assembly 119, etc.).

The controller 120 may include a microprocessor, an application-specific integrated circuit (ASIC), a field-programmable gate array (FPGA), etc., or combinations thereof. The controller 120 may include memory, which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of NO$_x$ emissions by accelerating a NO$_x$ reduction process between the ammonia and the NO$_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example a diesel oxidation catalyst (DOC)) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber 104. For instance, the DPF 102 and the SCR catalyst 106 may be combined into a single unit. In some implementations, the dosing module 112 may instead be positioned downstream of a turbocharger or upstream of a turbocharger. In other implementations, the dosing module 112 may provide air, reductant, and/or air-reductant mixture into a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. Example Dosing Module

Figure 2:
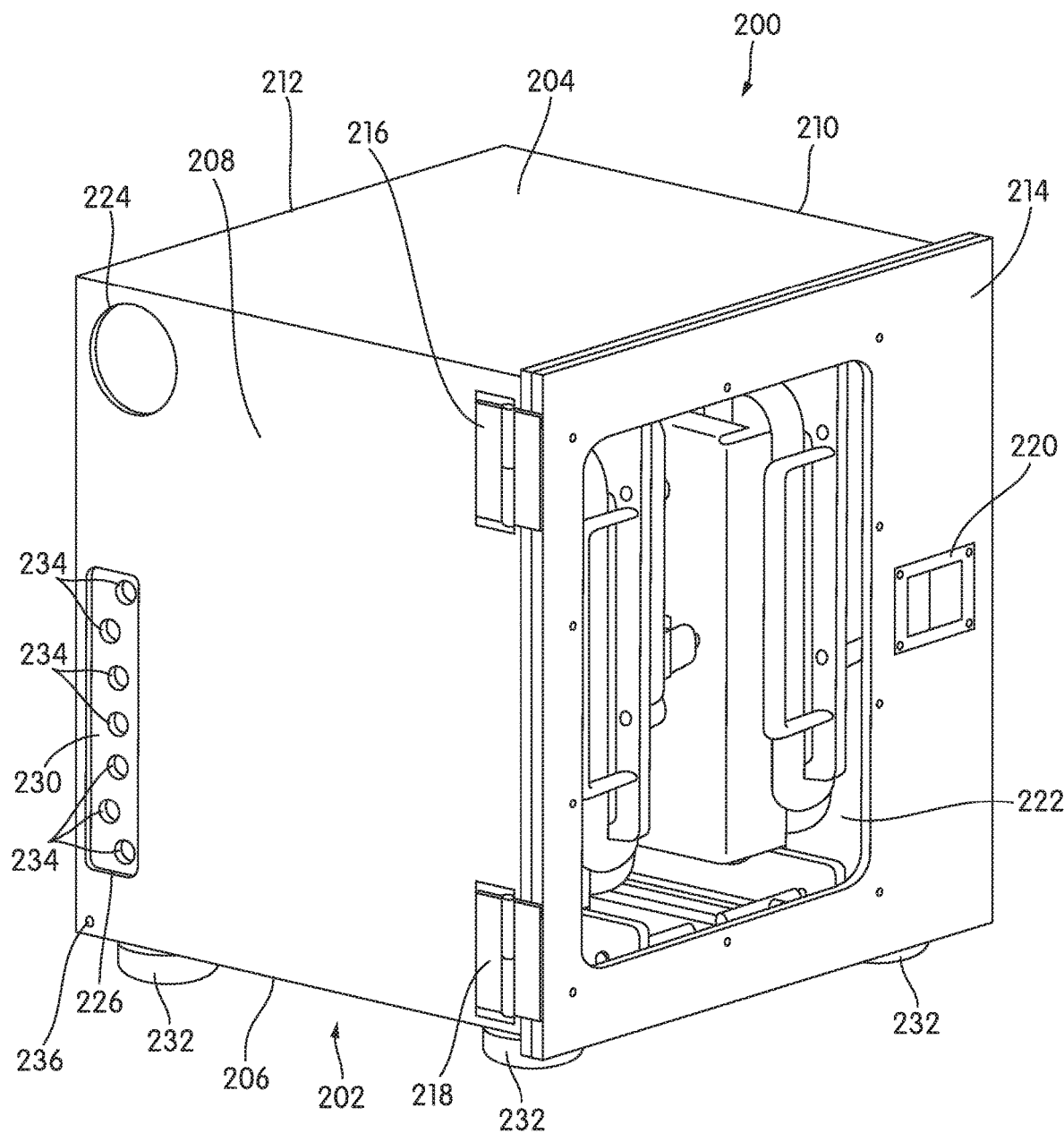
FIG. 2 is a perspective view of an example dosing module for an aftertreatment system, such as the aftertreatment system shown in FIG. 1.
Figure 3:
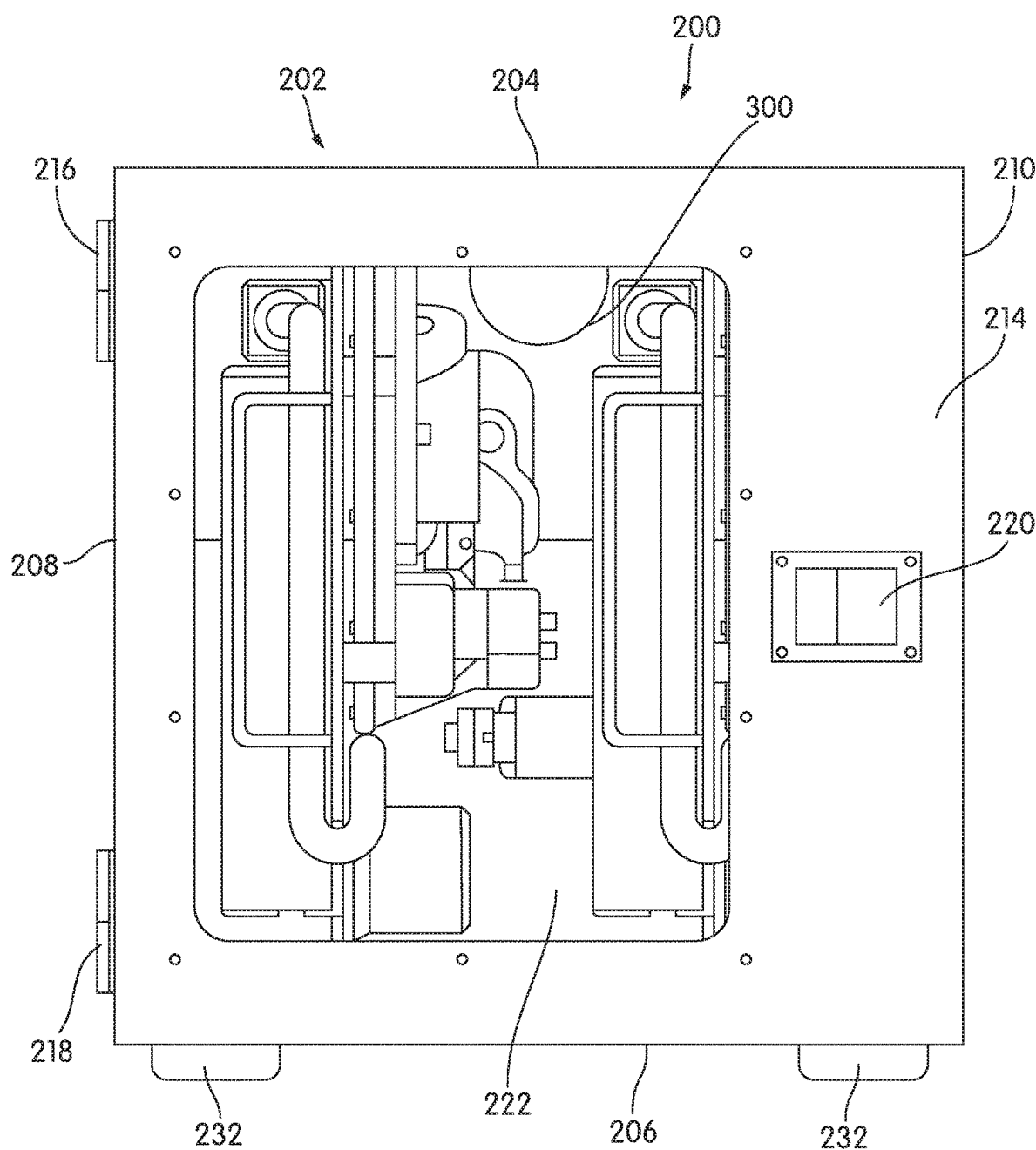
FIG. 3 is a front view of the example dosing module for an aftertreatment system shown in FIG. 2.
Figure 4:
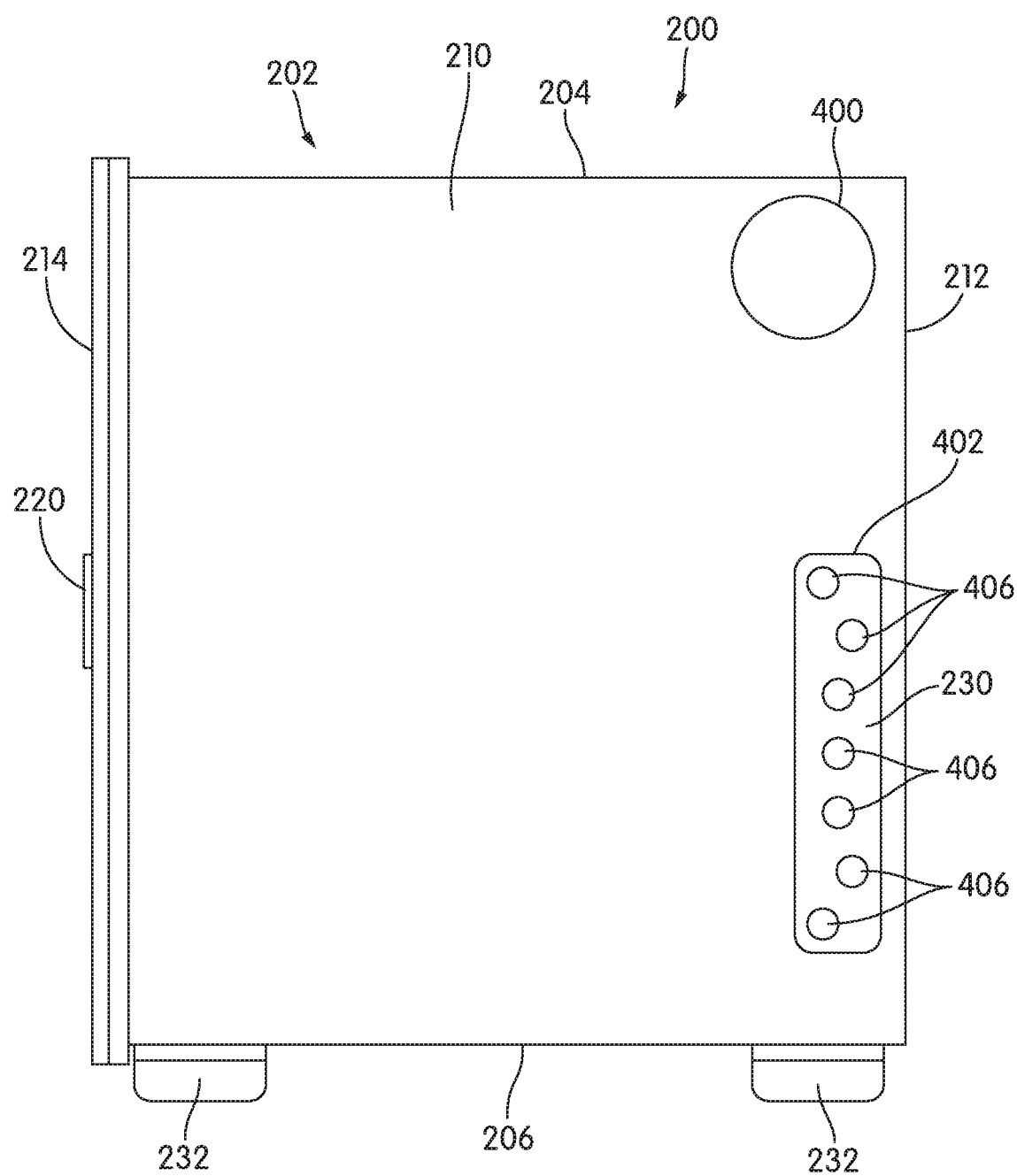
FIG. 4 is a right side view of the example dosing module for an aftertreatment system shown in FIG. 2.

FIGS. 2-4 depict a dosing module 200 (e.g., a supply module, an electronics module, etc.), such as the dosing module 112 shown in FIG. 1, according to an example embodiment. As will be described in more detail herein, the dosing module 200 performs air and reductant metering to provide an air-reductant mixture within a decomposition chamber, such as the decomposition chamber 104. In some embodiments, the air and the reductant are mixed in the decomposition chamber, such as after being provided by a static dosing lance, such as the static dosing lance assembly 119. In other embodiments, the air and the reductant within the dosing module 200 and are provided to the static dosing lance as an air-reductant mixture. The dosing module 200 includes electronic controls that separately control metering of the air and the reductant such that a target air-reductant mixture can be provided to the decomposition chamber. In an example embodiment, the dosing module 200 does not include a compressor and is instead connected to a compressor as shown in FIG. 1. However, in other applications, the dosing module 200 includes a compressor. In some applications, the dosing module 200 may include, or be connected to, any of a filter (e.g., air filter, reductant filter, etc.), a heater, and a cooler.

The dosing module 200 includes a frame assembly 202 (e.g., body, shell, cabinet, etc.). The frame assembly 202 houses (e.g., contains, covers, encapsulates, etc.) internal components of the dosing module 112. The frame assembly 202 includes a top panel 204, a bottom panel 206, a left side panel 208, a right side panel 210, a rear panel 212, and a front panel 214 (e.g., service door, etc.). In an example embodiment, the top panel 204 is substantially parallel with the bottom panel 206; the left side panel 208 is substantially parallel with the right side panel 210; and the rear panel 212 is substantially parallel with the front panel 214. In this embodiment, the top panel 204 and the bottom panel 206 are substantially orthogonal to the left side panel 208, the right side panel 210, the rear panel 212, and the front panel 214; and the left side panel 208 and the right side panel 210 are additionally substantially orthogonal to the rear panel 212 and the front panel 214.

As shown in FIGS. 2-4, the frame assembly 202 includes a first hinge 216 and a second hinge 218 that are hingedly attached to the front panel 214. The first hinge 216 and the second hinge 218 are also hingedly attached to the left side panel 208 such that the front panel 214 may be rotated about the first hinge 216 and the second hinge 218 relative to the left side panel 208 between a first position (e.g., a closed position, etc.) and a second position (e.g., fully open position). When the front panel 214 is in the first position, contents of the dosing module 200 are secured within the frame assembly 202 and access to an interior of the frame assembly 202 is prevented. When the front panel 214 is in the second position, contents of the dosing module 200 may be accessed by a user (e.g., operator, driver, technician, etc.). For example, the front panel 214 may be opened such that components of the dosing module 200 can be replaced. The first hinge 216 and the second hinge 218 may instead be coupled to other portions of the frame assembly 202 (e.g., the right side panel 210, the top panel 204, the bottom panel 206, etc.) such that the front panel 214 can rotate differently for various applications.

In an example embodiment, the first hinge 216 and the second hinge 218 are lift off hinges (e.g., slip joint hinges, detachable hinges, etc.). In this way, the front panel 214 may be vertically lifted such that the front panel 214 is decoupled at the first hinge 216 and the second hinge 218, facilitating the removal of the front panel 214 from the frame assembly 202. In some applications, the front panel 214 may only be decoupled at the first hinge 216 and the second hinge 218 once the front panel 214 has been rotated a target angular distance relative to the closed position. For example, the front panel 214 may only be decoupled at the first hinge 216 and the second hinge 218 once the front panel 214 has been rotated more than fifteen degrees.

The front panel 214 also includes a locking assembly 220. The locking assembly 220 functions to secure the front panel 214 in the closed position. For example, the locking assembly 220 may secure the front panel 214 to the right side panel 210. The locking assembly 220 may utilize latches, keys, or other interfaces such that the locking assembly 220 can be selectively repositioned between a first position (e.g., locked position, etc.), where the front panel 214 is secured in the first position (e.g., closed position, etc.), and a second position (e.g., unlocked position, etc.), where the front panel 214 is free to be rotated to achieve a target position (i.e., via a user input, etc.) other than the first position (e.g., the second position, etc.). In an example embodiment, the locking assembly 220 is a paddle latch.

The front panel 214 also includes a viewing window 222. The viewing window 222 facilitates viewing of the interior of the frame assembly 202. For example, the viewing window 222 may facilitate viewing of various components of the dosing module 200 within the frame assembly 202. Through the use of the viewing window 222, rapid diagnosis of any malfunction within the dosing module 200 can be performed.

While not shown, the front panel 214 and/or the frame assembly 202 includes a seal that substantially prevents the transmission of air, reductant, debris (e.g., dust, dirt, mud, etc.), and water between the front panel 214 and the top panel 204, the bottom panel 206, the left side panel 208, and the right side panel 210 when the front panel 214 is in the closed position. The seal may be a ring seal, a weathertight seal, or other similar seal. For example, the dosing module 200 may include a ring seal that is coupled to an edge of the top panel 204, the bottom panel 206, the left side panel 208, and the right side panel 210 such that the ring seal compresses against the front panel 214 when the front panel 214 is in the closed position.

The left side panel 208 includes a first aperture 224 and a second aperture 226. The first aperture 224 selectively receives a wiring harness (e.g., from a controller, from an engine control module, etc.). The first aperture 224 may selectively receive a cover that prevents access from outside of the frame assembly 202 into the frame assembly 202, and vice versa. The cover may be removed when the first aperture 224 receives the wiring harness and may be replaced when the first aperture 224 does not receive the wiring harness. The second aperture 226 receives a manifold 230 such that access through the frame assembly 202 to the manifold 230 is facilitated by the second aperture 226. As will be explained in more detail below, the manifold 230 facilitates the distribution of reductant and gas between the dosing module 200 and various sources.

The dosing module 200 also includes a plurality of isolators 232 (e.g., silicon cup mount isolates, etc.). As shown in FIGS. 2-4, the isolators 232 are coupled to the bottom panel 206 and positioned at corners thereof. The isolators 232 function to reduce vibrations transferred to the frame assembly 202 and, therefore, to the components of the dosing module 200 within the frame assembly 202. For example, the isolators 232 may dampen vibrations from a vehicular chassis that are transmitted from movement members (e.g., wheels, etc.) when surface irregularities (e.g., bumps, etc.) are traversed. Additionally or alternatively, the isolators 232 may all be coupled to any of the top panel 204, the left side panel 208, the right side panel 210, and the rear panel 212. For example, the dosing module 200 may be configured with some of the isolators 232 coupled to the rear panel 212 (i.e., to dampen vibrations from a first surface of a vehicular chassis) and others of the isolators 232 coupled to the bottom panel 206 (i.e., to dampen vibrations from a second surface of the vehicular chassis). The isolators 232 may be serviceable and/or replaceable. In other applications, the dosing module 200 does not include isolators 232 and the dosing module 200 is instead a "hard mount." For example, the dosing module 200 may be configured such that the bottom panel 206 or the rear panel 212 directly interfaces with a vehicle chassis. In these examples, the bottom panel 206 or the rear panel 212 includes chassis mounts (e.g., flanges, etc.) for mounting the dosing module 200 on the vehicle chassis.

The rear panel 212 includes an aperture 300. The aperture 300 selectively receives a wiring harness (e.g., from a controller, from an engine control module, etc.). The aperture 300 may selectively receive a cover that prevents access from outside of the frame assembly 202 into the frame assembly 202, and vice versa. The cover may be removed when the aperture 300 receives the wiring harness and may be replaced when the aperture 300 does not receive the wiring harness.

The right side panel 210 includes a first aperture 400 and a second aperture 402. The first aperture 400 selectively receives a wiring harness (e.g., from a controller, from an engine control module, etc.). The first aperture 400 may selectively receive a cover that prevents access from outside of the frame assembly 202 into the frame assembly 202, and vice versa. The cover may be removed when the first aperture 400 receives the wiring harness and may be replaced when the first aperture 400 does not receive the wiring harness. The second aperture 402 receives the manifold 230 such that access through the frame assembly 202 to the manifold 230 is facilitated by the second aperture 402. Because the frame assembly 202 includes the first aperture 224, the aperture 300, and the first aperture 400, the dosing module 200 can be adapted for use in various applications because the dosing module 200 can receive a wiring harness from various locations.

The manifold 230 includes a first set of connectors 234 and a second set of connectors 406. Some of the connectors within the first set of connectors 234 and the second set of connectors 406 function as inputs to the manifold 230, and the others of the connectors within the first set of connectors 234 and the second set of connectors 406 function as outputs to the manifold 230. Air and reductant may enter the manifold 230 separately through conduits (e.g., hoses, etc.)

coupled to the inputs and exit the manifold 230 together through conduits coupled to the outputs.

In an example embodiment, the first set of connectors 234 and the second set of connectors 406 each include seven connectors, each connector corresponding to one of: a reductant supply conduit (i.e., from a reductant supply), a reductant return conduit, a reductant delivery conduit to a first static dosing lance within the static dosing lance assembly 219, a reductant delivery conduit to a second static dosing lance within the static dosing lance assembly 219, an air supply conduit (i.e., from an air supply), an air return conduit, an air delivery conduit to the first static dosing lance within the static dosing lance assembly 219, and an air delivery conduit to the second static dosing lance within the static dosing lance assembly 219. The first set of connectors 234 and the second set of connectors 406 may be an O-ring boss (ORB) fittings or other similar fittings, such as fittings standardized by the Society of Automotive Engineers (SAE).

In some applications, some of the first set of connectors 234 and/or the second set of connectors 406 may be unused (i.e., are not coupled to a conduit). In these applications, the unused of the first set of connectors 234 and/or the second set of connectors 406 may be plugged with a fitting (e.g., ORB fitting, etc.). Other configurations of the dosing module 200 may utilize other configurations of the manifold 230. For example, the manifold 230 may not include the second set of connectors 406 in some applications.

The dosing module 200 provides individual air and reductant metering for each static dosing lance within a static dosing lance assembly, such as the static dosing lance assembly 119. As described herein, the dosing module 200 is configured for a static dosing lance assembly that includes two static dosing lances. However, the dosing module 200 may be similarly configured for applications where the static dosing lance assembly includes one, three, or more static dosing lances.

The frame assembly 202 also includes a drainage port 236. According to an example embodiment, the drainage port 236 is positioned along a bottom edge (i.e., an edge proximate to the bottom panel 206) of the left side panel 208. The drainage port 236 functions to prevent accumulation of reductant within the frame assembly 202. The frame assembly 202 is configured (e.g., structured, etc.) to collect any reductant that has leaked from within the dosing module 200 and direct the reductant towards the drainage port 236. For example, the bottom panel 206 may be slanted and/or shaped to passively direct the reductant towards the drainage port 236. The drainage port 236 may be configured to receive a hose (e.g., via a standard fitting, etc.) for applying vacuum suction to draw reductant from the drainage port 236. For example, the drainage port 236 may be threaded.

Figure 5:
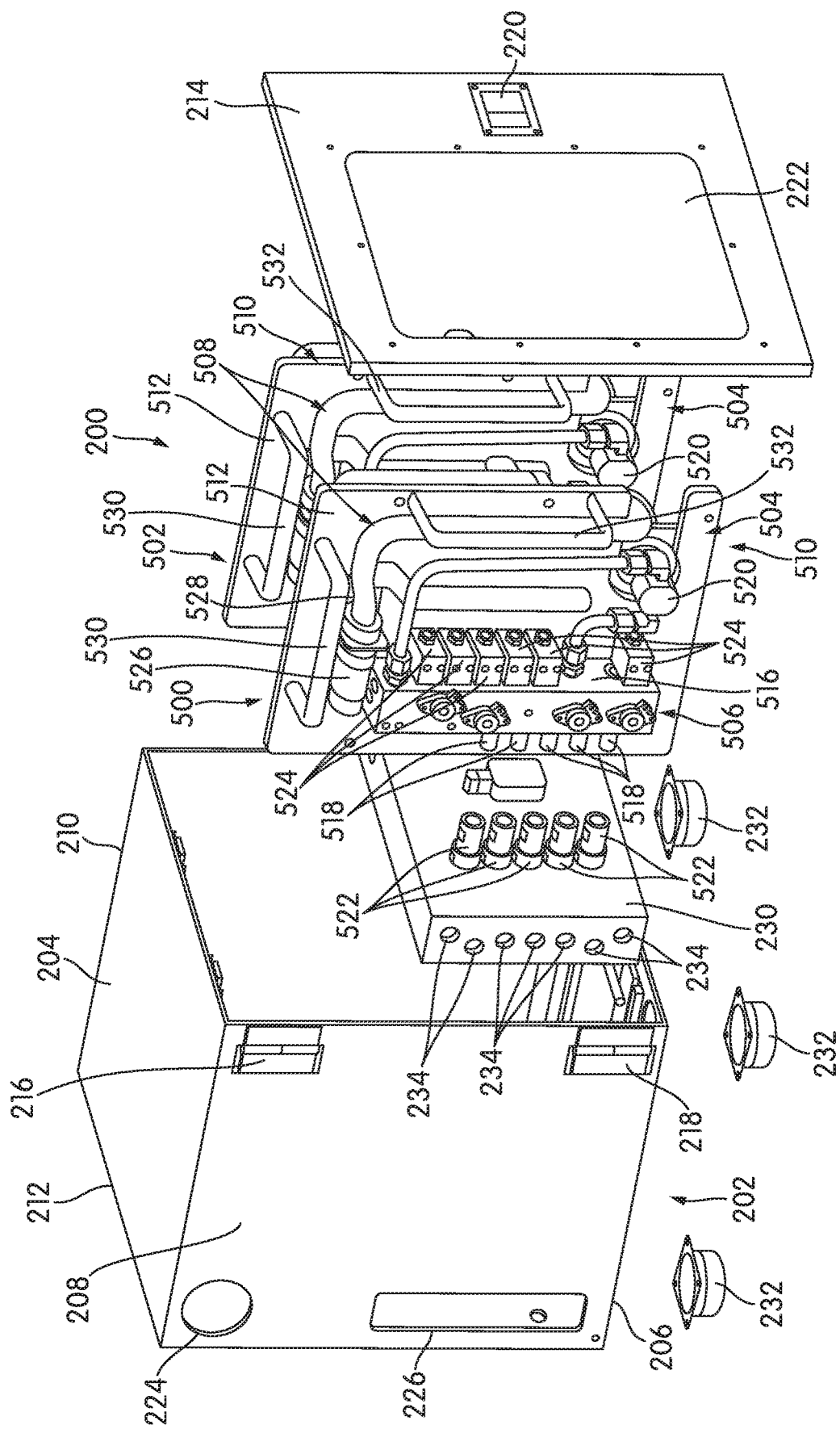
FIG. 5 is a perspective exploded view of an example dosing module for an aftertreatment system.

As shown in FIG. 5, the dosing module 200 includes a first dosing tray 500 and a second dosing tray 502. In an example embodiment, the first dosing tray 500 functions to separately receive a first amount (e.g., volume, etc.) of air and a first amount of reductant, to separately meter the first amount of air and the first amount of reductant, and to separately provide the first amount of air and the first amount of reductant for a first static dosing lance within the static dosing lance assembly 119 to the first set of connectors 234, whereby the first amount of air and the first amount of reductant are provided to the first static dosing lance. In this example embodiment, the second dosing tray 502 functions to separately receive a second amount of air and a second amount of reductant, to separately meter the second amount of air and the second amount of reductant, and to separately provide the second amount of air and the second amount of reductant for a second static dosing lance within the static dosing lance assembly 119 to the second set of connectors 406, whereby the second amount of air and the second amount of reductant are provided to the second static dosing lance.

In other applications, the first dosing tray 500 functions to meter air and reductant to provide an air-reductant mixture for a first static dosing lance within the static dosing lance assembly 119 to the first set of connectors 234, whereby the air-reductant mixture is provided to the first static dosing lance. In these applications, the second dosing tray 502 functions to separately meter air and reductant to provide an air-reductant mixture for a second static dosing lance within the static dosing lance assembly 119 to the second set of connectors 406, whereby the air-reductant mixture is provided to the second static dosing lance.

According to an example embodiment, the first dosing tray 500 is identical to the second dosing tray 502. As will be described further herein, the first dosing tray 500 and the second dosing tray 502 are selectively removable from the dosing module 200. Because of the identical nature of the first dosing tray 500 and the second dosing tray 502, the first dosing tray 500 and/or the second dosing tray 502 are easily replaceable (e.g., upgradable, etc.). Additionally, the first dosing tray 500 and the second dosing tray 502 can be easily serviced by a user. When the first dosing tray 500 or the second dosing tray 502 is decoupled from the dosing module 200, the dosing module 200 continues to operate. Therefore, the aftertreatment system (e.g., the aftertreatment system 100, etc.) associated with the dosing module 200 can continue to operate. As a result, downtime of the aftertreatment system is minimized. Further, this flexibility allows the first dosing tray 500 or the second dosing tray 502 to be serviced by a user at a later time (e.g., when returning to a service location, etc.).

Each of the first dosing tray 500 and the second dosing tray 502 includes a frame assembly 504, a metering system 506, and an electrical system 508. The frame assembly 504 includes a base panel 510. The base panel 510 defines a first side 512 (e.g., wet side, etc.) and a second side 514 (e.g., dry side, etc.) that is opposite the first side 512. The metering system 506 is coupled to the first side 512. The electrical system 508 is partially coupled to both the first side 512 and the second side 514. The metering system 506 includes a manifold 516, a plurality of connectors 518 (e.g., stab connectors, quick connectors, etc.), and a pump 520 (e.g., gear pump, etc.). Each of the manifolds 516 facilitates metering of air, reductant, and/or air-reductant mixture to one of the static dosing lances.

The plurality of connectors 518 are directly coupled to the manifold 516. For example, the manifold 516 may include a plurality of apertures (e.g., openings, holes, etc.), each configured (e.g., structured, etc.) to receive one of the connectors 518 (e.g., via a threaded interface, etc.). Advantageously, the manifold 516 simultaneously acts as a heat exchanger to cause the reductant to reach ambient temperature.

The manifold 230 also includes a plurality of connectors 522 that are configured (e.g., structured, etc.) to interface with the connectors 518. Each of the connectors 522 couples to one of the connectors 518 such that air, reductant, and/or air-reductant mixture can be exchanged between the manifold 230 and the manifold 516. The manifold 230 includes two identical columns of the connectors 522, each row configured to receive the connectors 518 of the first dosing tray 500 and the second dosing tray 502. Each of the connectors 518 is aligned with one of the connectors 522.

The connectors 518 and the connectors 522 are configured such that the connectors 518 may be inserted into, or over, the connectors 522 when the manifold 516 is horizontally translated (e.g., slid, moved, etc.) relative to the manifold 230. Horizontal translation of the manifold 516 occurs when the base panel 510 is horizontally translated. The base panel 510 can be horizontally translated between a first position (e.g., operational position, installed position, inserted position, etc.), where the connectors 518 and the connectors 522 are coupled, and various other positions (e.g., non-operational positions, uninstalled positions, etc.), where the connectors 518 and the connectors 522 are not coupled.

When the connectors 518 and the connectors 522 become coupled (e.g., connected, etc.), air, reductant, and/or air-reductant mixture may flow between the connectors 518 and the connectors 522. When the connectors 518 and the connectors 522 become decoupled (e.g., disconnected, etc.), air, reductant, and/or air-reductant mixture does not flow between the connectors 518 and the connectors 522. For example, when the connectors 518 and the connectors 522 become decoupled, the connectors 518 and the connectors 522 become sealed.

A user can install the first dosing tray 500 by horizontally translating (e.g., sliding, pulling, pushing, inserting, etc.) the base panel 510 such that the connectors 518 are coupled to the connectors 522. Similarly, a user can uninstall the first dosing tray 500 by horizontally translating the base panel 510 such that the connectors 518 are not coupled to the connectors 522 and subsequently removing the first dosing tray 500 from the dosing module 200. The connectors 518 and the connectors 522 may be configured to produce an audible and/or tactile feedback indication (e.g., via detents, etc.) that conveys to the user that the connectors 518 and the connectors 522 are coupled and/or are not coupled. For example, when the connectors 518 are coupled to the connectors 522, an audible sound may be produced.

The pump 520 is coupled to the base panel 510. The pump 520 is in fluid communication with the manifold 516 via a conduit. The pump 520 receives air or reductant at a first pressure from the manifold 516 and provides the air or reductant at a second pressure greater than the first pressure back to the manifold 516. In some applications, the air and the reductant are maintained separately within the manifold 516. In other applications, the air and reductant are combined into the air-reductant mixture within the manifold 516. In this way, the pump 520 can propel air, reductant, and/or air-reductant mixture from the manifold 516, via the connectors 518 and the connectors 522, to the manifold 230 at a target pressure. This target pressure may be determined based on requirements of the static dosing lance assembly 119 and/or the aftertreatment system 100 with which the dosing module 200 is associated. For example, a greater target pressure may be required for applications with larger (e.g., in terms of displacement, etc.) internal combustion engines (e.g., high horse power internal combustion engines, etc.) than for applications with smaller (e.g., in terms of displacement, etc.) internal combustion engines. The target pressure may also be determined based on a commanded dosing rate, such as a commanded dosing rate provided by the controller 120 to the dosing module 200.

The metering system 506 also includes a plurality of valves 524 (e.g., solenoid valves, etc.). The plurality of valves 524 are directly coupled to the manifold 516. For example, the manifold 516 may include a plurality of apertures (e.g., openings, holes, etc.), each configured (e.g., structured, etc.) to receive one of the valves 524 (e.g., via a threaded interface, etc.). Each of the valves 524 functions to control a rate of flow of air, reductant, or air-reductant mixture within the manifold 516. The valves 524 are operable between a first position, where flow past the valves 524 is prohibited (e.g., completely blocked, etc.), and a second position, where a maximum flow past the valves 524 (e.g., wide open, full open, etc.) is facilitated. Each of the valves 524 may be associated with one of the connectors 518.

The electrical system 508 includes a plug 526 and a plug bracket 528. The plug 526 is configured to be selectively coupled (e.g., connected, etc.) to a wiring harness (i.e., extending through the first aperture 224 and/or the first aperture 400) within the dosing module 200 that is communicable with an electrical system of a vehicle with which the dosing module 200 is associated. Horizontal translation of the first dosing tray 500 and the second dosing tray 502 is limited by the wiring harness when the plug 526 is coupled thereto. The plug 526 may be configured to be "poka-yoke" (e.g., substantially "mistake proof," etc.).

To facilitate horizontal translation of the first dosing tray 500 and/or the second dosing tray 502, the plug is decoupled (e.g., disconnected, etc.) from the wiring harness. Similarly, when the first dosing tray 500 and/or the second dosing tray 502 is reinserted into the dosing module, the plug 526 is coupled (e.g., connected, etc.) to the wiring harness. The coupling between the plug 526 and the wiring harness may occur prior to the first dosing tray 500 and/or the second dosing tray 502 being fully inserted (i.e., where the connectors 518 couple to the connectors 522). The plug bracket 528 is coupled to the first side 512 of the base panel 510 and functions to selectively secure the plug 526 relative to the base panel 510. The plug bracket 528 assists in coupling and decoupling the plug 526 and the wiring harness. For example, the plug bracket 528 maintains a position of the plug 526 relative to the base panel 510.

To assist in horizontal translation of the first dosing tray 500 and the second dosing tray 502, each of the first dosing tray 500 and the second dosing tray 502 may include a first handle 530 (e.g., service handle, etc.) and a second handle 532 (e.g., service handle, etc.). The first handle 530 and the second handle 532 may be grasped (e.g., grabbed, etc.) by a user to horizontally translate the first dosing tray 500 or the second dosing tray 502. The first handle 530 and the second handle 532 also assist the user in transporting and moving the first dosing tray 500 or the second dosing tray 502 outside of the dosing module 200 (e.g., when transporting the first dosing tray 500 or the second dosing tray 502 to a waste receptacle, etc.). The first handle 530 may be generally orthogonal to the second handle 532. In an example embodiment, the first handle 530 and the second handle 532 each extend from the first side 512 of the base panel 510. The first handle 530 and the second handle 532 may extend from the base panel 510 at an angle that is generally orthogonal to the base panel 510. In this way, the first handle 530 and the second handle 532 may protect various components of the electrical system 508, such as a wiring harness or the plug 526, from incidental contact with a surface or structure, such as may occur if the first dosing tray 500 or the second dosing tray 502 is accidentally dropped.

Figure 6:
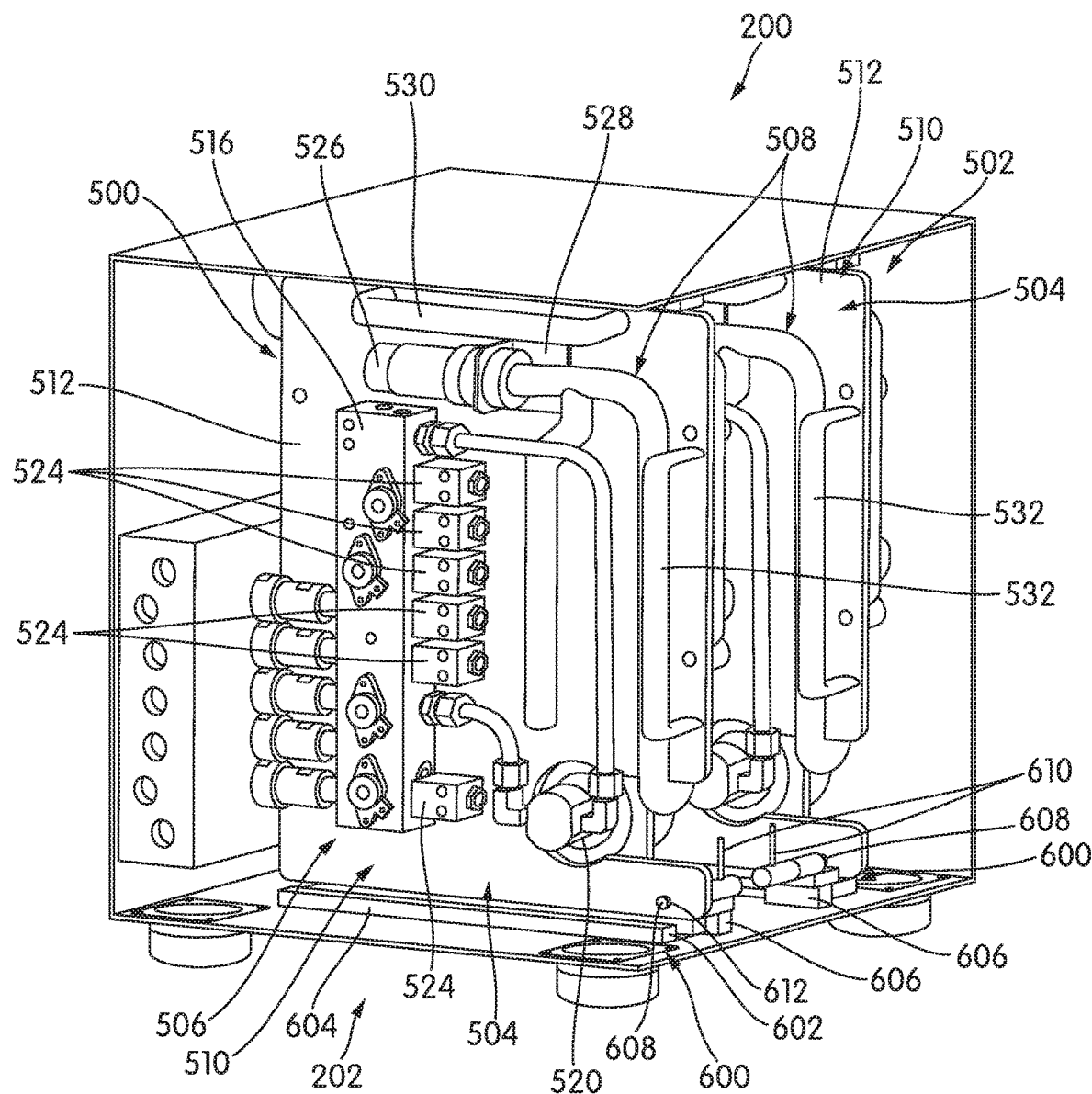
FIG. 6 is a perspective view of a portion of the example dosing module for an aftertreatment system shown in FIG. 5.
Figure 7:
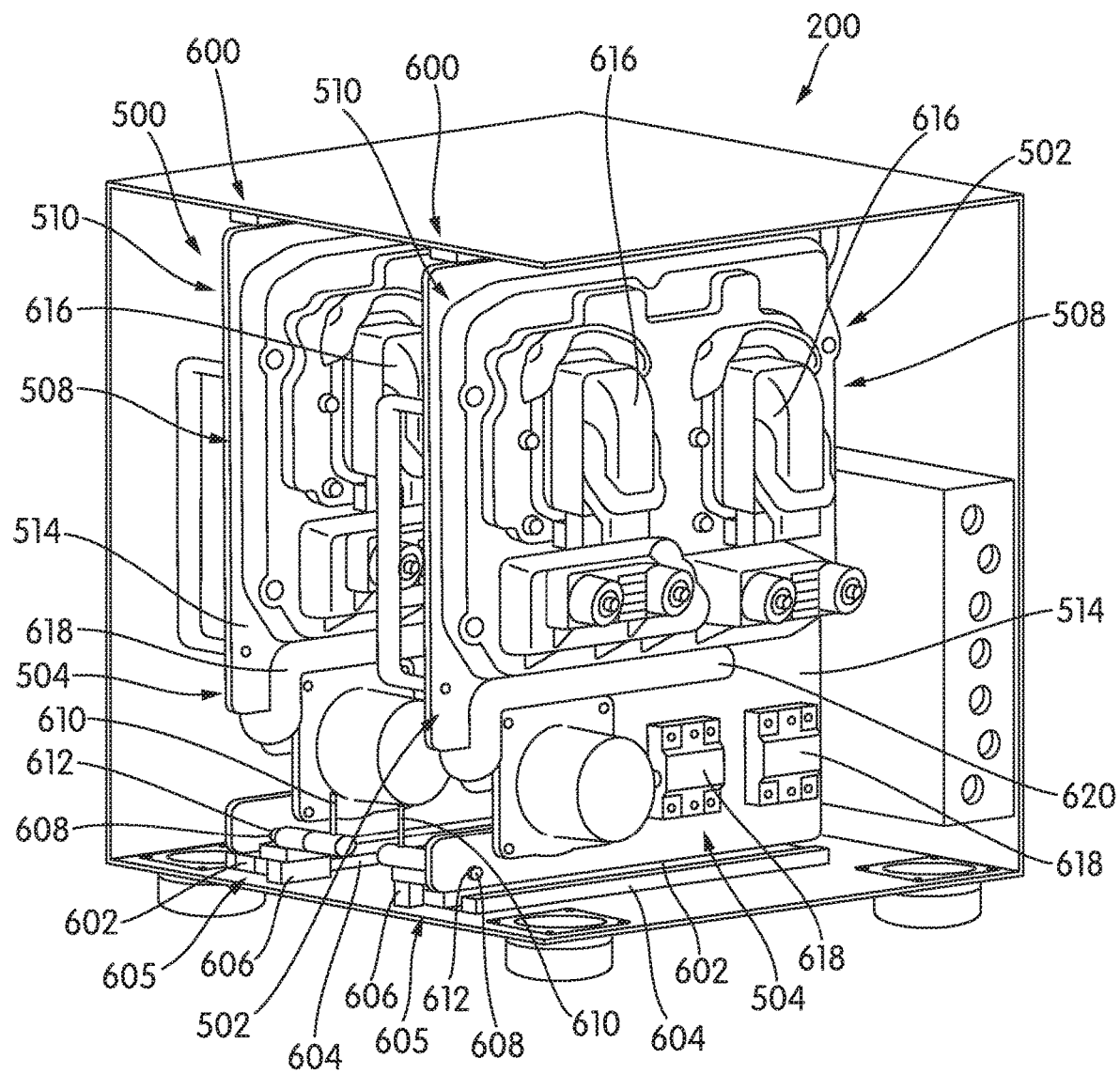
FIG. 7 is a perspective view of another portion of the example dosing module for an aftertreatment system shown in FIG. 5.
Figure 8:
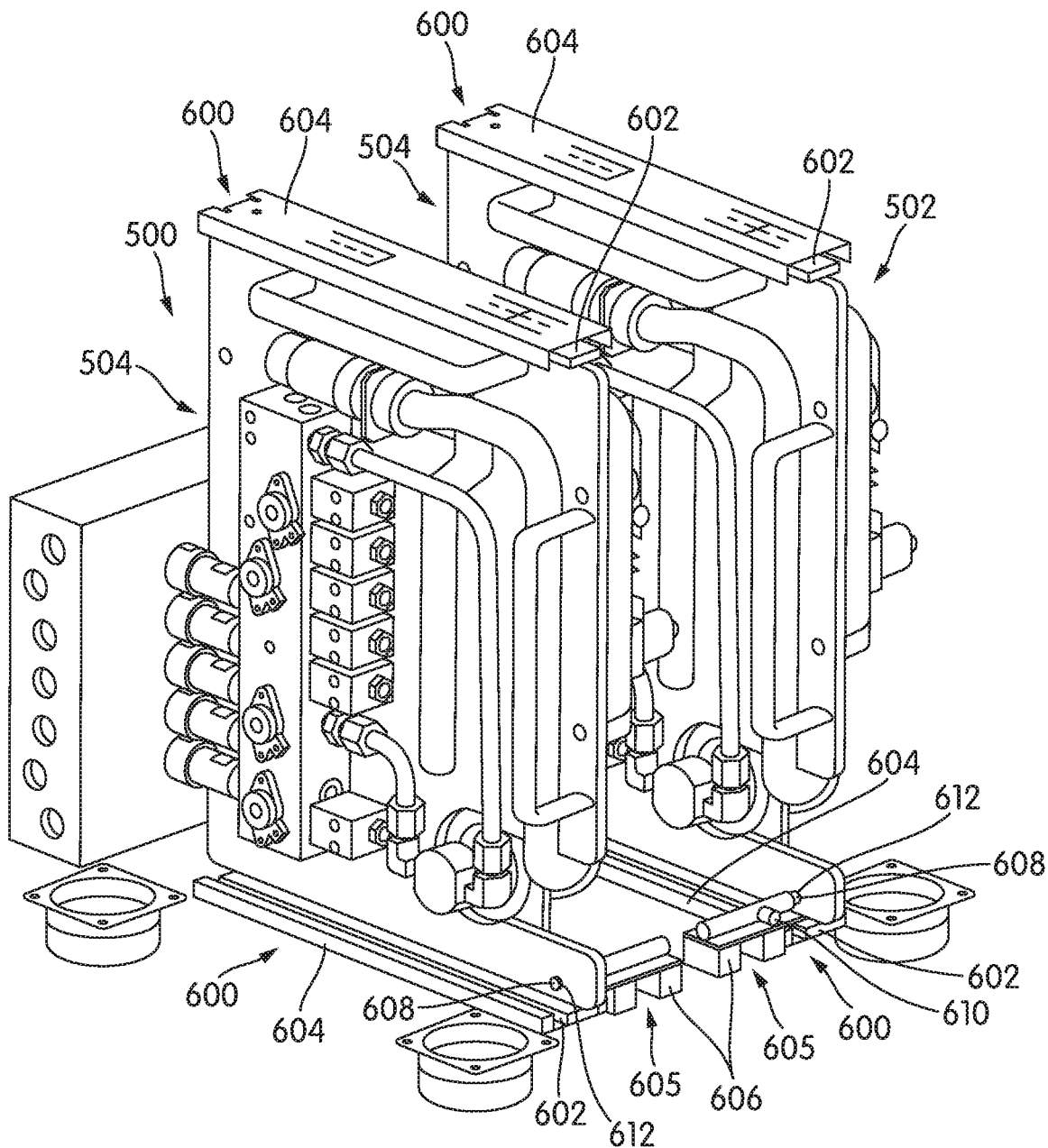
FIG. 8 is a perspective view of yet another portion of the example dosing module for an aftertreatment system shown in FIG. 5.

FIG. 6 illustrates the dosing module 200 with the left side panel 208 and the front panel 214 hidden. Similarly, FIG. 7 illustrates the dosing module 200 with the right side panel 210 and the front panel 214 hidden. The dosing module 200 also includes four rail assemblies 600, two of which are associated with each of the first dosing tray 500 and the second dosing tray 502. Each of the rail assemblies 600 include a first member 602 which is coupled to or integrated within the base panel 510, and a second member 604, which is coupled to or integrated within the frame assembly 202. The rail assemblies 600 can be best seen in FIG. 8, which illustrates the dosing module 200 with the frame assembly 202 hidden.

According to an example embodiment, two of the second members 604 are coupled to or integrated within the top panel 204, and two of the second members 604 are coupled to or integrated within the bottom panel 206. The first member 602 and the second member 604 of each rail assembly 600 cooperate such that the first member 602 can be horizontally translated relative to the second member 604. In this way, the rail assemblies 600 facilitate horizontal translation of the first dosing tray 500 and the second dosing tray 502. The second member 604 of the rail assembly 600 is slidably coupled to the first member 602 and is selectively repositionable between a first position (e.g., closed position, etc.) and a second position (e.g., open position, etc.). The rail assemblies 600 may, for example, incorporate ball bearings to facilitate translation of the first dosing tray 500 and the second dosing tray 502.

The dosing module 200 also includes two locking assemblies 605, each of the locking assemblies 605 associated with one of the first dosing tray 500 and the second dosing tray 502. Each of the locking assemblies 605 are coupled to the frame assembly 202, proximate one of the rail assemblies 600. In an example embodiment, the locking assemblies 605 are coupled to the bottom panel 206. The locking assemblies 605 cooperate with the base panel 510 to hold the base panel 510 in a target position (e.g., the inserted position, the installed position, etc.). The locking assemblies 605 are operable between a locked position, where the base panel 510 is held in the target position, and an unlocked position, where the base panel 510 is free to horizontally translate relative to the locking assembly 605.

Each of the locking assemblies 605 includes a base 606, a pin 608 that is movable within the base, and a handle 610 integrated within, or attached to, the pin 608 that a user may grasp (e.g., grab, etc.) to move the pin 608. Each of the pins 608 is selectively received within at least one hole 612 (e.g., cavity, detent, aperture, etc.) within the base panel 510. When the pin 608 is received in the hole 612, the base panel 510 having the hole 612 is held in the target position. If the base panel 510 includes multiple holes, including the hole 612, the base panel 510 having the holes may be held in multiple positions, including the target position.

Each of the pins 608 is movable within the base 606 between a first position, where the corresponding locking assembly 605 is in the locked position, and a second position, where the corresponding locking assembly 605 is in the unlocked position. For example, the base 606 may include slots that are configured to selectively receive the handles 610 to hold the pins 608 in the locked position. Movement of the pins 608 into the locked position may produce an audible noise (e.g., click, snap, etc.) that notifies a user that a rigid (e.g., secure, etc.) connection had been made.

The handles 610 are movable by the user to cause movement of the pins 608. The handles 610 are tool-less such that the handles 610 may be moved by the user without the use of tools. Additionally, the handles 610 may be knurled or otherwise textured to aid the user in grasping the handles 610 while wearing gloves. Instead of the handles 610 and the pins 608, the locking assemblies 605 may incorporate levers, camps, bolts, or other similar mechanisms.

Because the locking assemblies 605 can be locked and unlocked without tools, and because the first dosing tray 500 and the second dosing tray 502 can easily be horizontally translated without having to decouple the connectors 518 and the connectors 522, the first dosing tray 500 and the second dosing tray 502 may be rapidly serviced and replaced by a user. When the first dosing tray 500 or the second dosing tray 502 is decoupled from the dosing module 200, the aftertreatment system (e.g., the aftertreatment system 100, etc.), and any internal combustion engine associated with the dosing module 200, may continue to operate. In this way, downtime of the dosing module 200 is minimized.

If any component within the first dosing tray 500 (e.g., the pump 520 or one of the valves 524) requires service or repair, the entire first dosing tray 500 may be removed from the dosing module 200 and replaced with a new first dosing tray 500. In this way, the first dosing tray 500 can also be upgraded. For example, the first dosing tray 500 can be replaced with a new first dosing tray 500 so that the valves 524 are upgraded with new valves 524 that offer, for example, improved performance or decreased energy consumption.

According to various embodiments, the first dosing tray 500 and the second dosing tray 502 are identical and interchangeable. In these embodiments, servicing and replacement of the first dosing tray 500 and the second dosing tray 502 may be performed more quickly and more easily. Further, this allows the user to store an auxiliary or back-up dosing tray that can be used in place of the first dosing tray 500 or the second dosing tray 502 rather than having to store two different back-up dosing trays, increasing the desirability of the dosing module 200.

The electrical system 508 of each of the first dosing tray 500 and the second dosing tray 502 includes two modules 616 (e.g., aftertreatment control modules (ACM), etc.), two relays 618 (e.g., solid state relays, etc.), and a wiring harness 620. The modules 616, relays 618, and wiring harness 620 are coupled to the second side 514 of the base panel 510. The relays 618 may function as physical devices that control the electrical system 508. The module 616 may include, for example, various sensors (e.g., temperature sensors, quality sensors, pressure sensors, etc.) and heaters. The wiring harness 620 extends across the base panel 510 to the first side 512 and terminates at the plug 526. The wiring harness 620 is at least partially secured to the first side 512 through the plug bracket 528. The modules 616 and the relays 618 are electrically coupled via the wiring harness 620, which may be electrically coupled to another wiring harness 620 or to another electrical system, such as an electrical system of a vehicle having the dosing module 200, via the plug 526. The modules 616 function to control the metering of air and reductant performed by the metering system 506. For example, the modules 616 may variously control the valves 524 and the pump 520. In an example embodiment, the first dosing tray 500 and the second dosing tray 502 do not include a compressor and/or a module dedicated to a reductant "day tank."

Figure 9:
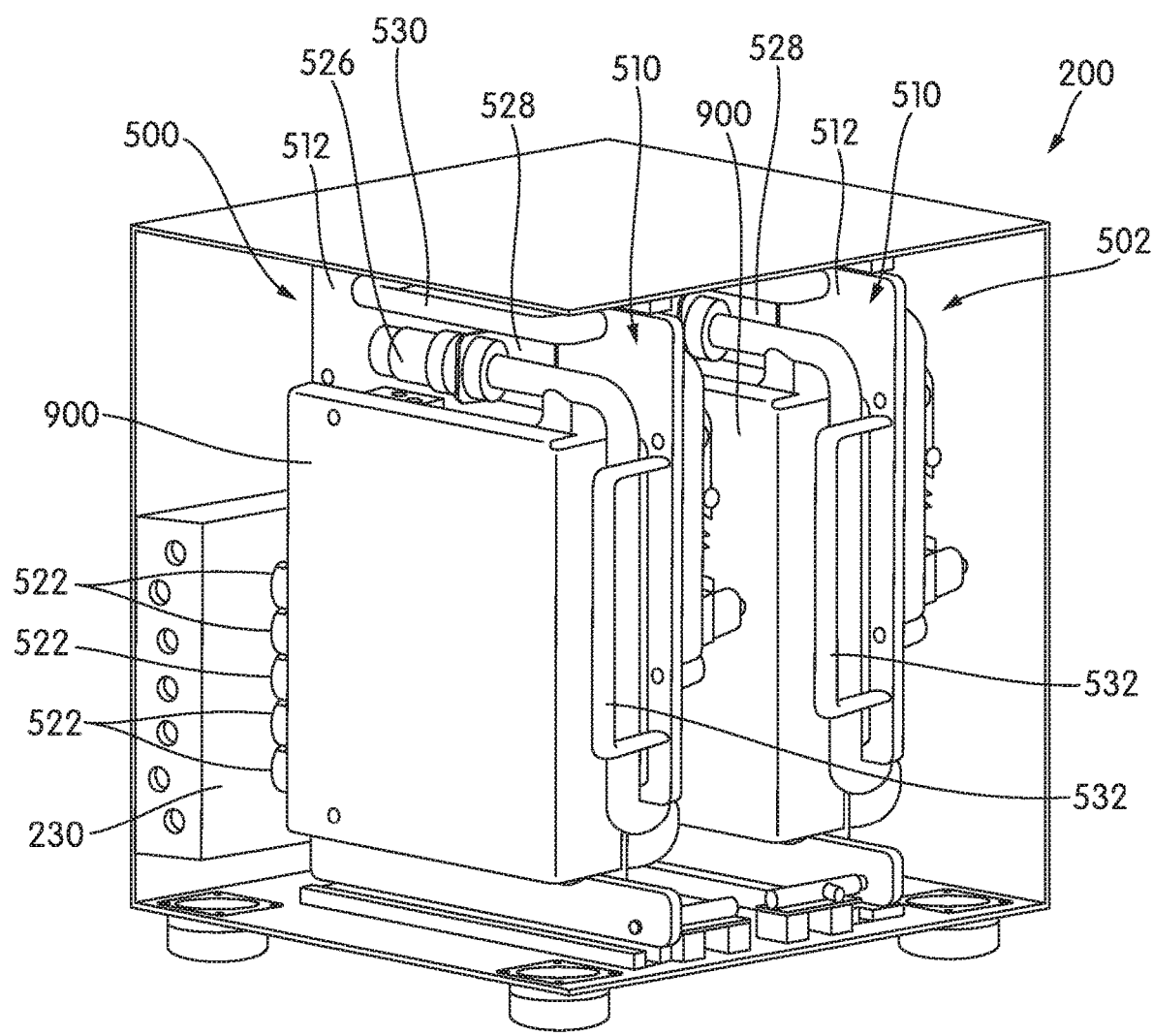
FIG. 9 is a perspective view of a portion of the example dosing module for an aftertreatment system shown in FIG. 2.

FIG. 9 illustrates the dosing module 200 with the left side panel 208 and the front panel 214 hidden. As shown in FIG. 9, the first dosing tray 500 and the second dosing tray 502 each include a shroud 900 that is coupled to the first side 512 of the base panel 510. The shroud 900 may be selectively coupled to the first side 512 (e.g., via fasteners, via clips, etc.) such that the shroud 900 may be easily removed by a user for diagnosis and/or repair of the first dosing tray 500 or the second dosing tray 502.

The shroud 900 substantially covers (e.g., encapsulates, etc.) much of the metering system 506. For example, the shroud 900 covers the manifold 516, the connectors 518, the pump 520, and the valves 524. The shroud 900 may cover a connection point (e.g., mating point, interfacing point, junction, etc.) between the connectors 518 and the connectors 522. However, the shroud 900 is configured such that the plug 526 is not covered by the shroud 900. In this way, the plug 526 remains accessible to a user to facilitate, for example, the easy disconnection of the plug 526 from a wiring harness. Similarly, the shroud 900 is configured such that the first handle 530 and the second handle 532 are not covered by the shroud 900.

The shroud 900 functions to shield the dosing module 200 from reductant leaks that may occur, for example, during operation of the dosing module 200, during removal of the first dosing tray 500 and/or the second dosing tray 502 (i.e., when the connectors 518 are decoupled from the connectors 522), and during insertion of the first dosing tray 500 and/or the second dosing tray 502 (i.e., when the connectors 518 are coupled to the connectors 522). In this way, the shroud 900 protects the electrical system 508 of the first dosing tray 500 and the electrical system 508 of the second dosing tray 502 from contact with reductant. For example, the shroud 900 may protect and encapsulate the wiring harness 620. In this way, the desirability of the dosing module 200 is increased compared to systems that do not offer similar protection against reductant leaks.

In an alternative embodiment, the frame assembly 202 does not include at least one of the top panel 204, the bottom panel 206, the left side panel 208, he right side panel 210, the rear panel 212, and the front panel 214. For example, the frame assembly 202 may include only the left side panel 208, the right side panel 210, and the front panel 214. In such applications, at least a portion of the frame assembly 202 may be built into a surrounding structure. For example, the rear panel 212 may be partially or completely replaced by a portion of a chassis. In another alternative embodiment, the frame assembly 202 does not include any of the top panel 204, the bottom panel 206, the left side panel 208, the right side panel 210, the rear panel 212, and the front panel 214. Instead, the frame assembly 202 may utilize various rails and/or other structures to support any of the manifold 230, the first dosing tray 500, and the second dosing tray 502. For example, the manifold 230 may be a hanging, or otherwise unsupported, strip (e.g., pillar, column, etc.) that is manually coupled to the first dosing tray 500 and the second dosing tray 502 by a user. In installation of the first dosing tray 500, for example, the user may grasp the manifold 230, align the connectors 522 with the connectors 518, and couple the connectors 522 to the connectors 518.

Figure 10:
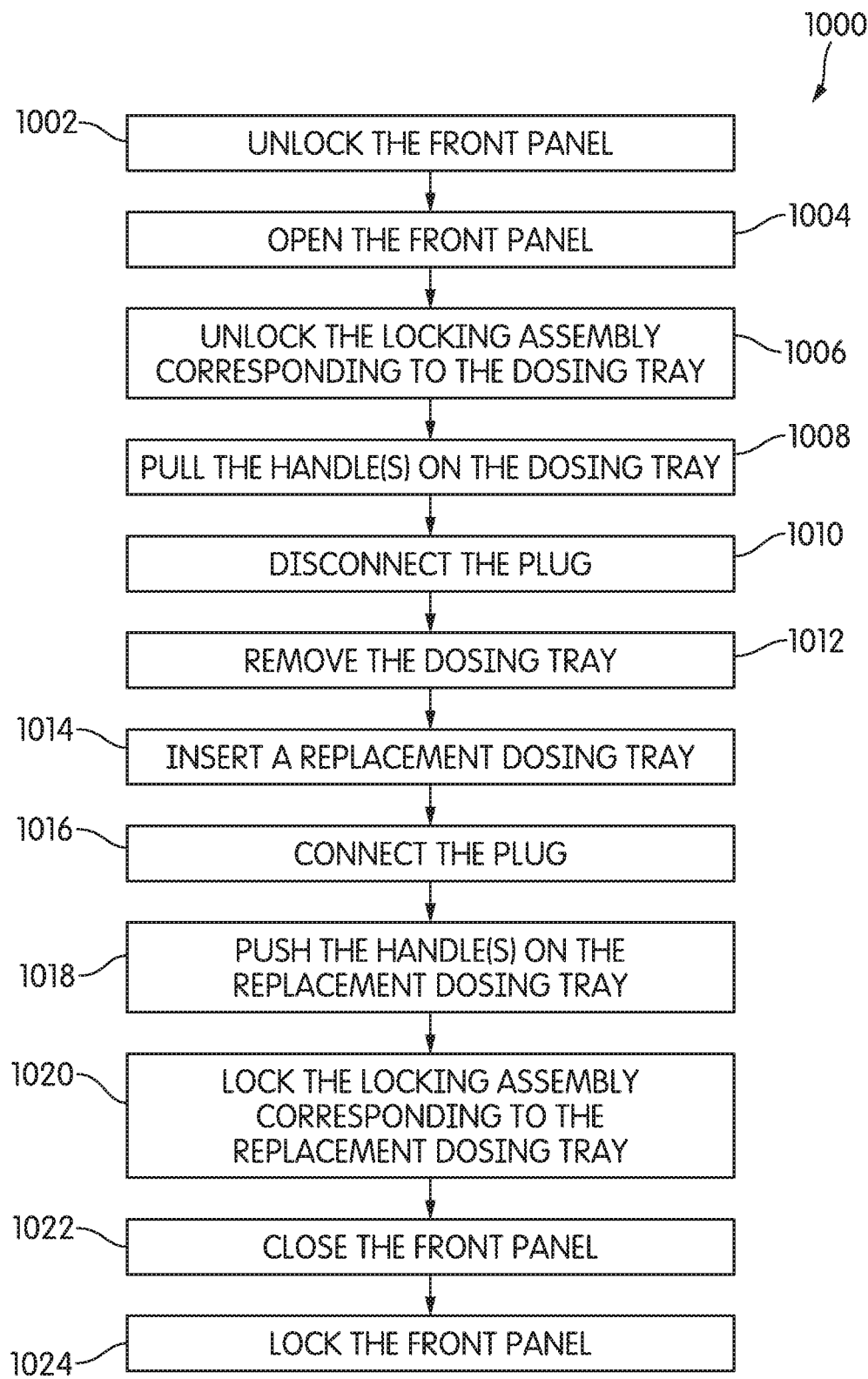
FIG. 10 is a flow chart for an example process of replacing a dosing tray of a dosing module for an aftertreatment system.

A process 1000 for replacing a dosing tray, such as the first dosing tray 500 or the second dosing tray 502, is shown in FIG. 10. The process 1000 may be carried out when the first dosing tray 500 or the second dosing tray 502 requires repair or when an upgrade is desired. The process 1000 begins with unlocking the front panel 214 via the locking assembly 220 (step 1002). After the front panel 214 has been unlocked, the front panel 214 is opened (step 1004). To open the front panel 214, the front panel 214 is rotated about the first hinge 216 and the second hinge 218. Once the front panel 214 has been opened, the front panel 214 may be removed (i.e., "lifted off" the first hinge 216 and the second hinge 218). The locking assembly 605 corresponding with the dosing tray 500/502 is then unlocked (step 1006). For example, the handle 610 and the pin 608 corresponding with the locking assembly 605 may be rotated and then axially translated so that the pin 608 is removed from the hole 612 in the base panel 510. The process 1000 continues with pulling the first handle 530 and/or the second handle 532 to cause horizontal translation of the dosing tray 500/502 (step 1008). The plug 526 is then disconnected from a wiring harness (step 1010). In some applications, the plug 526 is disconnected prior to pulling the first handle 530 and/or the second handle 532. The dosing tray (e.g., the first dosing tray 500, the second dosing tray 502, etc.) is then removed from the dosing module 200 (step 1012). For example, the dosing tray 500/502 may be unclipped, or otherwise decoupled, from the first member 602. Additionally, the dosing tray 500/502 may simply be further horizontally translated such that the first member 602 slides completely out of the second member 604. In these examples, the first member 602 may be decoupled from the second member 604 without the use of tools (i.e., in a tool-less operation).

A replacement or upgraded dosing tray is then inserted into the dosing module 200 and clipped, or otherwise coupled, to the first member 602 (step 1014). The plug 526 is then connected from to the wiring harness (step 1016). The process 1000 continues with pushing the first handle 530 and/or the second handle 532 to cause horizontal translation of the dosing tray (step 1018). In some applications, the plug 526 is after pushing the first handle 530 and/or the second handle 532. The locking assembly 605 corresponding with the dosing tray is then locked (step 1020). For example, the handle 610 and the pin 608 corresponding with the locking assembly 605 may be rotated and then axially translated so that the pin 608 is inserted into the hole 612 in the base panel 510. The process 1000 continues with closing the front panel 214 (step 1022). For example, the front panel 214 is closed by rotating about the first hinge 216 and the second hinge 218. In some applications, the front panel 214 is first replaced onto the first hinge 216 and the second hinge 218 before the front panel 214 is closed. The process 1000 ends with locking the front panel 214 via the locking assembly 220 (step 1024).

Figure 11:
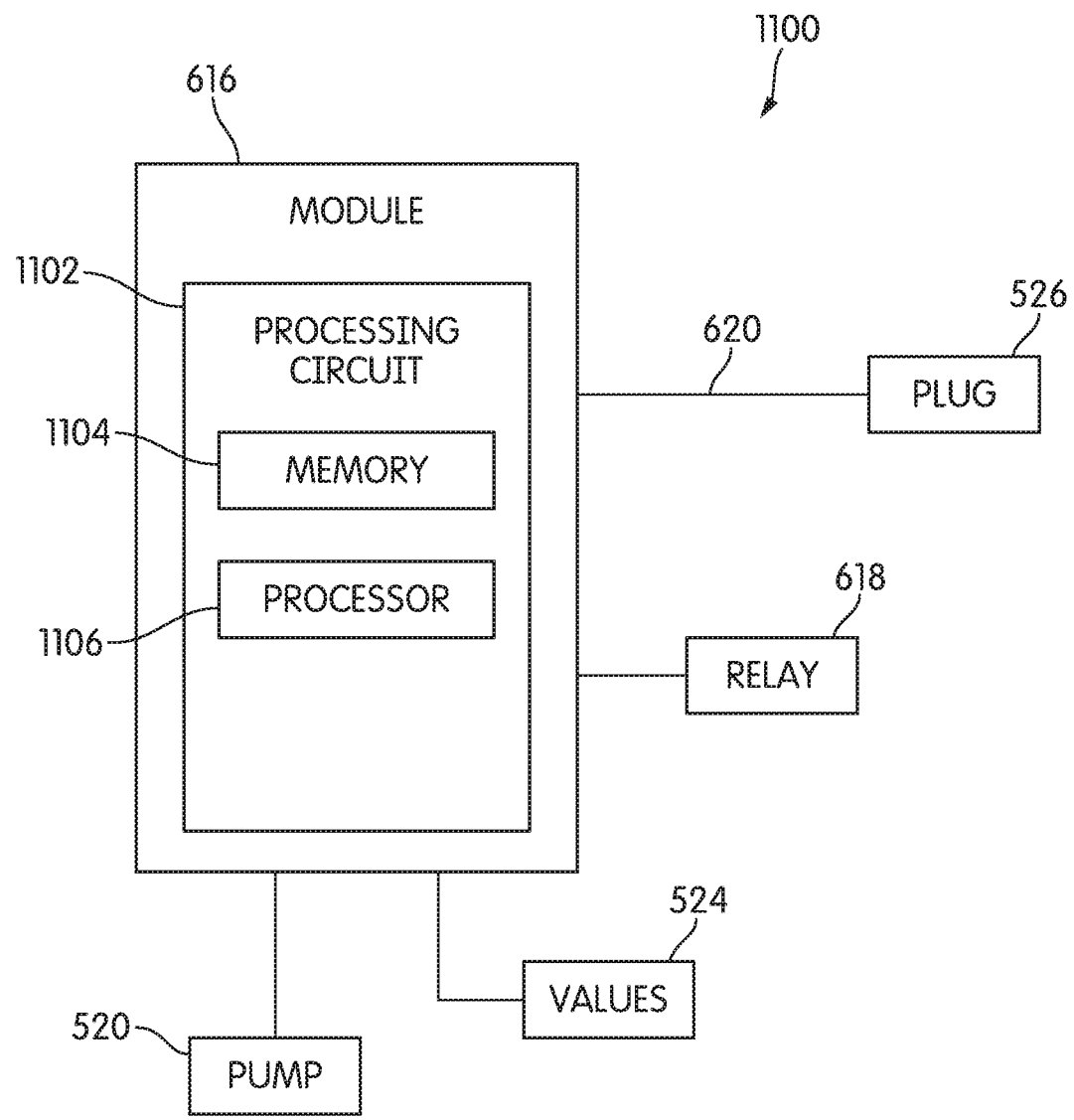
FIG. 11 is a block diagram of an example control system for a dosing tray of a dosing module for an aftertreatment system.

FIG. 11 depicts a control system 1100 for a dosing tray (e.g., the first dosing tray 500, the second dosing tray 502, etc.) of the dosing module 200, according to an example embodiment. As shown in FIG. 11, the control system 1100 includes the module 616. The pump 520, the valves 524, the plug 526, the relay 618, and the wiring harness 620 are electrically or communicatively coupled to the module 616. The module 616 is configured to control the dosing tray to provide an air-reductant mixture to an aftertreatment system (e.g., the aftertreatment system 100, etc.). The module 616 may control a concentration of reductant within the air-reductant mixture and/or a pressure or volume of air-reductant mixture provided to the aftertreatment system. The module 616 may include a microprocessor, an ASIC, an FPGA, etc., or combinations thereof. The module 616 includes a processing circuit 1102 having a memory 1104, which may include, but is not limited to, electronic, optical, magnetic, or any other storage or transmission device capable of providing a processor 1106 (e.g., an ASIC, an FPGA, etc.) with program instructions. The memory 1104 may include a memory chip, EEPROM, EPROM, flash memory, or any other suitable memory from which the module 616 can read instructions. The instructions may include code from any suitable programming language.

The module 616 may receive information from an external electrical system (e.g., an engine control module, etc.) via the plug 526. For example, the module 616 may receive a target concentration of reductant in the air-reductant mixture, or the module 616 may receive a target pressure or volume of the air-reductant mixture. The module 616 functions to control operation of the pump 520 and the valves 524. Specifically, operating the pump 520 may cause air, reductant, and/or air-reductant mixture to be propelled into the aftertreatment system, while operating the valves 524 may alter the concentration of reductant in the air-reductant mixture. In this way, the module 616 can meter the reductant. While not shown, the module 616 may include various sensors (e.g., temperature sensors, quality sensors, pressure sensors, etc.) and heaters. The sensors and heaters may be configured to interface with air, reductant, or air-reductant mixture.

In some applications, multiple dosing modules 200 are utilized, each interfacing with, for example, two static dosing lances such that each static dosing lance within a static dosing lance assembly may be provided a metered air, reductant, and/or air-reductant mixture. Due to the construction of the frame assembly 202, the dosing modules 200 may be easily stacked (e.g., placed on top of each other, etc.) and/or fastened (e.g., bolted, attached, coupled, etc.) together. For example, the top panel 204 of one dosing module 200 may be fastened to the bottom panel 206 of another dosing module 200. In another example, the left side panel 208 of one dosing module 200 may be fastened to the right side panel 210 of another dosing module 200. The dosing modules 200 may also be mounted (e.g., to a vehicle chassis, etc.) independent of one another.

In one example embodiment, the dosing module 200 is three-hundred and fifty millimeters (e.g., 13.8 inches, etc.) deep (i.e., along the horizontal axis, etc.), three-hundred and sixty-two millimeters (e.g., 14.3 inches, etc.) wide, and three-hundred and seventy-five millimeters (e.g., 14.8 inches, etc.) tall (i.e., along the vertical axis, etc.). In this embodiment, the left side panel 208 and the right side panel 210 may have a length of approximately three-hundred and forty-five millimeters (e.g., 13.6 inches, etc.) and a height of approximately three-hundred and sixty-five millimeters (e.g., 14.4 inches, etc.). Similarly, the front panel 214 may have a length of approximately three-hundred and sixty millimeters (e.g., 14.2 inches, etc.) and a height of approximately three-hundred and seventy millimeters (e.g., 14.6 inches, etc.). Further, the top panel 204 and the bottom panel 206 may have a length of approximately three-hundred and fifty-four millimeters (e.g., 13.5 inches, etc.) and a height of approximately three-hundred and forty-five millimeters (e.g., 13.6 inches, etc.). In this example embodiment, the dosing module 200 is significantly smaller than conventional dosing systems, which may occupy between three and eight times the volume of the dosing module 200. In this way, the dosing module 200 provides a user with significant space savings.

In an example embodiment, the various components of the dosing module 200 are constructed and configured such that the dosing module 200 can withstand reductant purging and manifold freezing (e.g., freeze plugs, etc.). For example, the frame assembly 202 may be constructed from aluminum, steel, stainless steels, or other metals. Similarly, the manifold 230 and the manifold 516 maybe constructed from, for example, billet aluminum, brass, and other similar components. In some applications, the frame assembly 202 is assembled via welding, riveting, or other similar methods. For example, the top panel 204 may be welded to the left side panel 208, the right side panel 210, and the rear panel 212.

As shown in FIGS. 2, 3, and 5-9, the dosing module 200 includes the first dosing tray 500 and the second dosing tray 502 and is in a "dual bank" configuration. However, the dosing module 200 may include only one of the first dosing tray 500 and the second dosing tray 502. In this configuration, the dosing module 200 is in a "single bank" configuration. Similarly, the dosing module 200 may be configured with more than two dosing trays.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or movable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid (e.g., exhaust, water, air, gaseous reductant, gaseous ammonia, etc.) may flow, either with or without intervening components or objects. Examples of fluid couplings or configurations for enabling fluid communication may include piping, channels, or any other suitable components for enabling the flow of a fluid from one component or object to another. As described herein, "preventing" should be interpreted as potentially allowing for de minimus circumvention (e.g., less than 1%) of air, reductant, debris (e.g., dust, dirt, mud, etc.), and water between the front panel 214 and the top panel 204, the bottom panel 206, the left side panel 208, and the right side panel 210 when the front panel 214 is in the closed position.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. A dosing module, comprising:
a frame assembly comprising a plurality of panels;
a first manifold coupled to one of the plurality of panels, the first manifold being configured to separately receive air and reductant, and the first manifold comprising a first connector extending from the first manifold;
a first dosing tray, the first dosing tray comprising:
a first base panel;
a second manifold coupled to the first base panel, the second manifold being configured to separately receive air and reductant from the first manifold and to provide the air and the reductant back to the first manifold;
a second connector extending from the second manifold, the second connector being configured to be selectively coupled to the first connector;
a first valve coupled to the second manifold and configured to receive at least one of the air or the reductant from the first manifold;
a second valve coupled to the second manifold and configured to receive at least one of the air or the reductant from the first manifold;
a first rail assembly comprising:
a first member coupled to one of the plurality of panels; and
a second member coupled to the first base panel and slidably coupled to the first member such that the first dosing tray is selectively movable relative to the first member.

2. The dosing module of claim 1, wherein:
the first dosing tray is selectively movable between a first position and a plurality of second positions;
the second connector is coupled to the first connector when the first dosing tray is in the first position; and
the second connector is not coupled to the first connector when the first dosing tray is not in the first position.

3. The dosing module of claim 1, wherein:
the first dosing tray further comprises
a module electrically communicable with the first valve and configured to control the first valve; and
the first valve is configured to alter an amount of the reductant provided by the second manifold.

4. The dosing module of claim 3, wherein:
the first base panel comprises a front face and a back face opposite the front face;
the second manifold is coupled to the front face; and
the module is coupled to the back face.

5. The dosing module of claim 4, further comprising a shroud coupled to the front face of the first base panel, the shroud configured to cover the second manifold, the first valve, and the second valve.

6. The dosing module of claim 1, further comprising a second dosing tray comprising:
a second base panel; and
a third manifold coupled to the second base panel, the third manifold being configured to separately receive air and reductant from the first manifold, and the third manifold being configured to provide air and reductant to the first manifold.

7. The dosing module of claim 6, wherein:
the first manifold further comprises a third connector extending from the first manifold; and
the second dosing tray further comprises a fourth connector extending from the third manifold, the fourth connector being configured to be selectively coupled to the third connector.

8. The dosing module of claim 7, further comprising a second rail assembly comprising:
a third member coupled to one of the plurality of panels; and
a fourth member coupled to the second base panel and slidably coupled to the third member such that the second dosing tray is selectively movable relative to the third member;
wherein:
the second dosing tray is selectively movable between a third position and a plurality of fourth positions;
the third connector is coupled to the fourth connector when the second dosing tray is in the third position; and
the third connector is not coupled to the fourth connector when the second dosing tray is not in the third position.

9. The dosing module of claim 1, further comprising:
a handle extending from the first base panel;
a plurality of isolators coupled to an external surface of one of the plurality of panels, the plurality of isolators configured to dampen vibrations transmitted to the dosing module; and
a locking assembly coupled to the one of the plurality of panels, the locking assembly being configured to selectively prevent movement of the first dosing tray.

10. A dosing module, comprising:
a frame assembly comprising a first panel;
a first manifold coupled to the first panel, the first manifold being configured to separately receive air and reductant; and
a first dosing tray positioned within the frame assembly, the first dosing tray comprising:
a second manifold configured to be selectively coupled to the first manifold, and the second manifold, when coupled to the first manifold, being configured to: (i) separately receive air and reductant from the first manifold, (ii) meter the air and the reductant, and (iii) provide the air and the reductant back to the first manifold;
a pump in fluid communication with the second manifold and configured to propel at least one of air or reductant, from the second manifold;
a first valve coupled to the second manifold and configured to receive at least one of the air or the reductant from the first manifold; and
a second valve coupled to the second manifold and configured to receive at least one of the air or the reductant from the first manifold.

11. The dosing module of claim 10, wherein:
the frame assembly further comprises:
a second panel coupled to the first panel; and
a third panel coupled to the first panel and parallel to the second panel; and
the first dosing tray is removably coupled to at least one of the second panel and the third panel such that the first dosing tray is located between the second panel and the third panel when the second manifold is coupled to the first manifold.

12. The dosing module of claim 10, wherein:
the first dosing tray is moveable away from the first panel to cause the second manifold to be decoupled from the first manifold; and
the first dosing tray is movable towards the first panel to cause the second manifold to be coupled to the first manifold.

13. The dosing module of claim 10 further comprising a first rail assembly comprising:
a first member; and
a second member coupled to the first dosing tray, the second member being slidably coupled to the first member such that the first dosing tray is selectively movable relative to the first member;
wherein the frame assembly further comprises:
a second panel coupled to the first panel; and
a third panel coupled to the first panel and parallel to the second panel; and
wherein the first member is coupled to one of the second panel and the third panel.

14. The dosing module of claim 13 further comprising a second rail assembly comprising:
a third member coupled to the other of the second panel and the third panel; and
a fourth member coupled to the first dosing tray, the fourth member slidably coupled to the third member such that the first dosing tray is selectively movable relative to the third member.

15. The dosing module of claim 14, wherein the first dosing tray is removable from the dosing module by: (i) decoupling the first member and the second member, and (ii) decoupling the third member and the fourth member.

16. The dosing module of claim 10, further comprising a second dosing tray positioned within the frame assembly, the second dosing tray comprising a third manifold configured to be selectively coupled to the first manifold, the third manifold, when coupled to the first manifold, being configured to: (i) separately receive air and reductant from the first manifold, (ii) meter the air and the reductant, and (iii) provide the air and the reductant back to the first manifold.

17. A dosing tray for a dosing module, the dosing tray configured to be selectively coupled to an external connector external to the dosing tray, the dosing tray comprising:
a base panel;
a manifold coupled to the base panel, the manifold being configured to separately receive air and reductant and provide the air and the reductant, the manifold comprising a second connector configured to be selectively coupled to the external connector such that: (i) at least one of the air and the reductant is flowable between the second connector and the external connector when the second connector is coupled to the external connector and (ii) the second connector is sealed when the second connector is not coupled to the external connector thereby preventing the flow of at least one of the air and the reductant between the second connector and the external connector;
a valve coupled to the manifold, the valve being configured to alter an amount of the reductant provided by the manifold; and
a module electrically communicable with the valve and configured to control the valve;
wherein the second connector is configured to be coupled to and decoupled from the external connector through translation of the base panel relative to the dosing module;
wherein the base panel comprises a front face and a back face opposite the front face;
wherein the manifold is coupled to the front face; and
wherein the module is coupled to the back face.

18. The dosing tray of claim 17, further comprising a shroud covering the manifold and the valve, the shroud being coupled to the base panel.

19. The dosing tray of claim 17, further comprising a pump coupled to the front face of the base panel, the pump being configured to alter a pressure of at least one of the air and the reductant provided by the manifold.

* * * * *